Patented Nov. 30, 1943

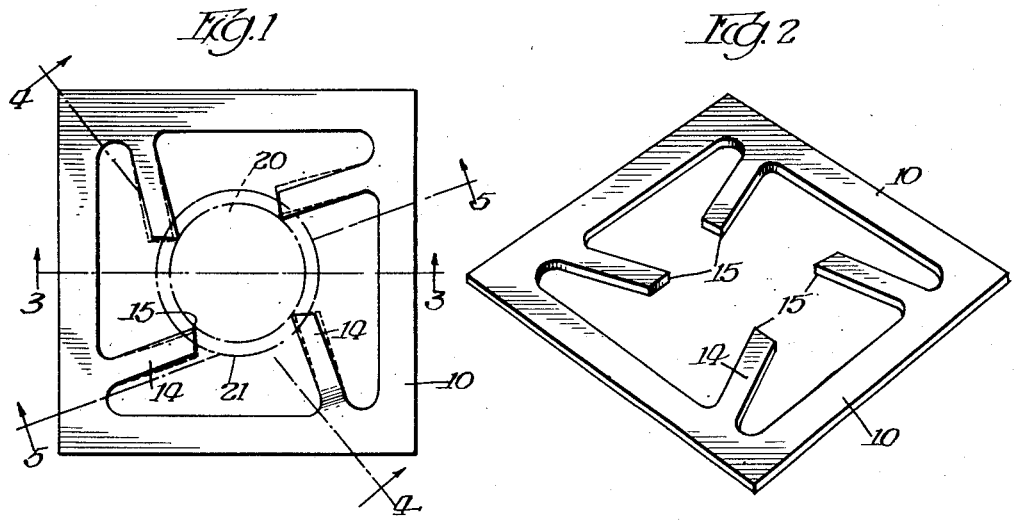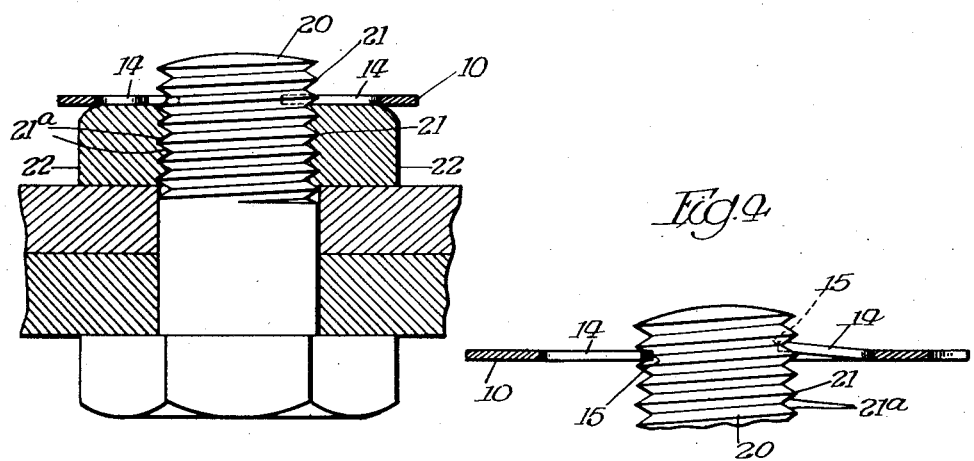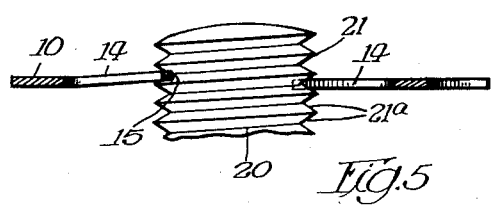

2,335,367

UNITED STATES PATENT OFFICE 2,335,367

LOCKING PLATE FOR SCREWS

Arthur H. Thompson, Chicago, Ill., assignor to Thompson-Bremer & Co., Chicago, Ill., a corporation of Illinois Application June 15, 1939, Serial No. 279,236

2 Claims. (Cl. 151—30)

The invention relates to locking plates for screws.

One object of the invention is to provide an improved locking plate for a screw, which is formed of flat sheet metal and is provided with integral tongues which are adapted to enter the groove of the screw-thread and serve effectively to lock the plate against reverse rotation.

Another object of the invention is to provide a locking plate in which the body or rim and the locking tongues are substantially coplanar so that the entire plate can be formed by a single stamping operation.

Other objects of the invention will be apparent from a consideration of the following detailed description.

The invention consists in the several novel features which are hereinafter set forth and are more particularly defined by claims at the conclusion hereof.

In the drawing: Fig. 1 is a plan view of a locking plate embodying the invention. Fig. 2 is a perspective view. Fig. 3 is a section illustrating the locking plate applied to lock a nut on a screw. Fig. 4 is a section on line 4—4 of Fig. 1. Fig. 5 is a section on line 5—5 of Fig. 1.

The invention is exemplified in a locking plate which is stamped from a flat sheet of metal of sufficiently heavy stock to provide the stability or rigidity that is desired in the plate. The plate is polygonal and comprises a body or rim 10 and a series of tongues 14 which are integral with, and extend inwardly from, the rim. The tongues are flat, and are also coplanar with the rim. The inner ends of the tongues normally extend into the groove of the V-shaped screw-thread of the screw on which the plate is to be used. The width of the tongues is such as to render them slightly resilient transversely of the screw and in the plane of the plate. Each tongue is provided with a pointed tooth 15 at one side of its inner edge and this tooth normally engages the inclined side-faces of the screw-thread. The tongues extend inwardly from the rim in such directions that they are somewhat off the dead-center between their outer ends where they are joined to the rim 10 and the axis of the screw. This off-center relation is at that side of the dead-center which will, when the nut is rotated to turn it on the screw, flex the tongues slightly in the plane of the rim and in the direction of rotation and thus permit the teeth 15 to slide around the side-faces of the screw-thread. When reverse rotative stresses or forces are applied to the plate the frictional engagement of the teeth with the side-faces of the thread will force the points of the teeth inward, but not across the dead-center and cause them to bite into the side-faces of the screw-thread and thereby automatically lock the plate against reverse rotation. This construction and arrangement of the tongues and teeth render the plate self-locking against reverse rotation by the resiliency of the tongues in the plane of the plate and the tongues without requiring longitudinal pressure against the plate by the work so that the plate will be effectively locked against reverse rotation in any position in which it is assigned on the screw. The thickness of the teeth and tongues is such that the teeth 15 will enter the V-shaped groove and engage the inclined side-faces of the screw-thread. The stresses or forces during reverse rotation of the plate, will be applied in the direction of the length of the tongues and effect effective gripping of the screw by the teeth 15. The tongues are sufficiently resilient longitudinally of the screw to permit the inner ends of the teeth to conform to the helix or spiral of the screw-thread. The teeth and tongues also constitute means for moving the plate longitudinally against the work when the plate is turned on the nut.

In Fig. 3 the plate is shown mounted on a screw 20 with a V-shaped screw-thread 21 having inclined side-faces 21a, and serving to lock a nut 22 against reverse rotation on the screw.

In use or operation, the plate is placed against the outer end of the screw and rotated. The plate may be turned by applying a wrench to the edge of the polygonal rim 10. The plate, by reason of the resiliency of the tongues in the plane of the rim and away from their dead-center positions, can be turned onto the screw until it has reached the desired position for locking the work or the screw or another nut. If pressure is exerted or vibration is produced which imposes reverse rotative stresses or forces on the nut, the stresses against the teeth will be directed to move the tongues toward, but not across, their dead-center positions. This will cause the teeth to bite into the inclined side faces of the screw-thread and lock the nut against reverse rotation.

The plate may be released for reverse rotation by a suitable tool which is adapted to apply pressure in a direction to disengage the tongues from the thread.

The locking plate which is shown in the drawing and represents or exemplifies one form of the invention is square as far as the rim 10 is concerned and has a square central opening or hole, In addition it includes four tongues 14 and these project inwards from the portions of the rim which define the corners of the hole. As illustrated in Figure 1 each tongue extends at an angle of approximately 70 degrees with respect to one adjacent inner side edge of the rim and at an angle of approximately 20 degrees with respect to the other adjacent side edge. Due to the angular arrangement of the tongues the tongues are substantially tangentially arranged with respect to the screw when the screw and locking plate are in assembled relation.

The invention involves a flat plate or rim which is provided with integral inwardly extending tongues which are slightly resilient in the plane of the plate and are also slightly resilient transversely of the plate or longitudinally of the screw to permit the inner ends of the tongues to conform to the helical groove in the screw.

The invention is not to be understood as restricted to the details set forth, since these may be modified within the scope of the appended claims, without departing from the spirit and scope of the invention.

Having thus described the invention, what I claim as new and desire to secure by Letters Patent is:

1. As a new article of manufacture, a one-piece locking plate for a screw, stamped from flat sheet metal and comprising a flat rim-like body having an over-sized hole in the central portion thereof for the screw, and an annular series of flat comparatively long tongues of uniform width from end to end joined to, and extending inwardly from, the hole defining portion of the body and having the top and bottom faces thereof normally parallel to, and coplanar with, the top and bottom faces of the body, and in addition having their inner ends shaped to form teeth adapted when the plate and screw are in assembled relation to fit between and engage the side faces of the thread of the screw, said tongues being laterally flexible and extending inwards in such directions that when the plate is turned onto the screw in connection with assembly thereof they flex laterally in one direction in substantially the plane of the body and their teeth-equipped inner ends slide on the side faces of the thread and when the plate is urged rotatively in the opposite direction they tend to flex laterally in the opposite direction in substantially the plane of the body and their inner ends, due to abutment or frictional engagement with the side faces of the thread, bite into said side faces and lock the plate against reverse rotation.

2. As a new article of manufacture, a one-piece locking plate for a screw, stamped from flat sheet metal and comprising a flat polygonal rim-like body having an over-sized square opening in the central portion thereof for the screw, and an annular series of four flat comparatively long tongues of uniform width from end to end joined to, and extending inwardly from, the inner corner portions of the body and having the top and bottom faces thereof normally parallel to, and coplanar with, the top and bottom faces of the body and in addition having their inner ends shaped to form teeth adapted when the plate and screw are in assembled relation to fit between and engage the side faces of the thread of the screw, said tongues being flexible laterally in the plane of the body and being so angularly positioned that each extends normally at approximately an angle of 70 degrees with respect to one of the adjacent inner side edges of the body and at approximately a 20 degree angle with respect to the other adjacent inner side edge of the body, said tongues, due to their angularity, being adapted when the plate is turned onto the screw in connection with assembly thereof to flex outwards in substantially the plane of the body and to have their inner ends slide on the side faces of the thread of the screw and when the plate is urged rotatively in the opposite direction to have their inner ends bite into the side faces of the thread and lock the plate against reverse rotation.

ARTHUR H. THOMPSON.